(12) United States Patent
Colman et al.

(10) Patent No.: US 7,779,750 B2
(45) Date of Patent: Aug. 24, 2010

(54) CLOSING MECHANISM FOR BREWING DEVICE

(75) Inventors: Arne Benjamin Colman, Notts (GB); Terence Graham Curtis, Bucks (GB); David Andrew Dalton, Loveland, OH (US); Daniel Scott, Berkshire (GB)

(73) Assignee: The Procter & Gamble Company, Cincinnati, OH (US)

( * ) Notice: Subject to any disclaimer, the term of this patent is extended or adjusted under 35 U.S.C. 154(b) by 902 days.

(21) Appl. No.: 11/502,990

(22) Filed: Aug. 11, 2006

(65) Prior Publication Data

US 2007/0034089 A1 Feb. 15, 2007

Related U.S. Application Data

(60) Provisional application No. 60/707,255, filed on Aug. 11, 2005.

(51) Int. Cl.
*A47J 31/00* (2006.01)
(52) U.S. Cl. ........................................ 99/295; 99/302 R
(58) Field of Classification Search ................... 99/295, 99/302 R, 300, 323.3; 220/263, 264, 823, 220/829, 830
See application file for complete search history.

(56) References Cited

U.S. PATENT DOCUMENTS

| | | | | |
|---|---|---|---|---|
| 5,163,574 | A * | 11/1992 | Sosan | 220/264 |
| 5,357,652 | A * | 10/1994 | Yamada | 16/232 |
| 5,649,472 | A | 7/1997 | Fond et al. | |
| 6,142,333 | A * | 11/2000 | Sasamoto et al. | 220/264 |
| 6,990,891 | B2 * | 1/2006 | Tebo, Jr. | 99/295 |
| 6,994,015 | B2 * | 2/2006 | Bruinsma | 99/289 R |
| 7,131,369 | B2 * | 11/2006 | Gantt et al. | 99/289 R |

FOREIGN PATENT DOCUMENTS

| | | |
|---|---|---|
| EP | 0 904 718 A | 3/1999 |
| WO | WO 96 08990 A | 3/1996 |
| WO | WO 01 15582 A | 3/2001 |

OTHER PUBLICATIONS

U.S. Appl. No. 11/502,989, filed Aug. 11, 2006, Colman, Beharry.
U.S. Appl. No. 11/502,996, filed Feb. 15, 2007, Colman, Curtis.
U.S. Appl. No. 29/236,122, filed Aug. 11, 2005, Colman, Beck, Brandt, Dalton.
U.S. Appl. No. 29/236,132, filed Aug. 11, 2005, Colman, Beck, Brandt, Dalton.

* cited by examiner

*Primary Examiner*—Reginald L Alexander
(74) *Attorney, Agent, or Firm*—Adam W. Borgman; Kim William Zerby

(57) ABSTRACT

A closure mechanism particularly useful in a brewing device includes a cover member rotatably disposed above the brewing device. A slider member is slidably disposed within an interior cavity of the cover member and has one or more tabs which may extend outside of the interior cavity. The brewing device has one or more receptacles for receiving the tabs when the cover member is closed. A lid member on top of the cover member may push the tabs into the receptacles through a link member. A release arm is disposed within the brewing device and has at least one blocker which releasably holds a tab of the slider member within a receptacle when the cover member is closed.

13 Claims, 9 Drawing Sheets

CLOSING MECHANISM FOR BREWING DEVICE

CROSS REFERENCE TO RELATED APPLICATIONS

This application claims the benefit of U.S. Provisional Application No. 60/707,255 filed Aug. 11, 2005.

FIELD OF THE INVENTION

The present invention concerns a closure mechanism for a brewing device. In particular it concerns a structure whereby the brewing chamber of a brewing device, such as a coffee brewer or an espresso brewer, may be quickly and easily closed and sealed to perform a brewing operation. The structure may have additional applicability to fields outside of the brewing art.

BACKGROUND OF THE INVENTION

Brewing devices are well known. Such devices are typically used to prepare beverages by mixing, steeping, soaking, or boiling a brewing material in water or other liquid. For example, coffee may be made by passing hot water through ground coffee beans, and tea may be made by seeping crushed tea leaves in hot water. Similarly, brewing materials may be a liquid, such as liquid creamer or chocolate. More generally, brewing material may include an extractable solid, liquid, powder, concentrate or other material used in a brewing operation. As used herein, the term "coffee" includes not only plain coffee, but also coffee in all its other forms such as for example espresso, cappuccino, mocha, decaffeinated coffee, and the like.

One of the many challenges faced in designing a brewing device is ensuring the brewing liquid, such as hot water, does not escape from the system to cause a mess. This can be especially true for single-cup brewing devices, which generally operate under pressure to rapidly brew a single cup of beverage at a time. A brewing device further needs to allow the person operating the device to access the brewing chamber between brews. The operator needs access to the brewing chamber so that the brewing material such as coffee grounds may be inserted to perform a brewing operation, and then removed for disposal after the brewing operation is completed. In some instances, such as when espresso is being prepared, the brewing liquid or steam is pressed through the brewing material at elevated pressures, increasing the need for a good seal.

SUMMARY OF THE INVENTION

A closure mechanism which is particularly useful in coffee brewers and other brewing devices is disclosed. The design incorporates a closure mechanism including a cover member rotatably disposed above the brewing device between an open position and a closed position. A slider member is slidably disposed within an interior cavity of the cover member and has one or more tabs which may extend outside of the interior cavity. The brewing device has one or more receptacles for receiving the tab(s) of the slider member when the cover member is in the closed position. A release arm is pivotally disposed within the brewing device and has at least one blocker which releasably holds a tab of the slider member within a receptacle when the cover member is in the closed position.

This design permits a quick and easy opening and closing of a brewing device to permit a user to insert or remove brewing material in a brewing chamber for a brewing operation. The described closure mechanism is further advantageous in that it may be operated with one hand, by a small amount of user-applied force.

These and other advantages of the present brewing design will become more apparent from a detailed description of the invention.

BRIEF DESCRIPTION OF THE DRAWINGS

In the accompanying drawings, which are incorporated in and constitute a part of this specification, embodiments of a brewing device are illustrated. These drawings, together with the general description of the design given above and the detailed description given below, serve to example the principles of the invention.

DETAILED DESCRIPTION OF THE PREFERRED EMBODIMENTS

Figure 1:
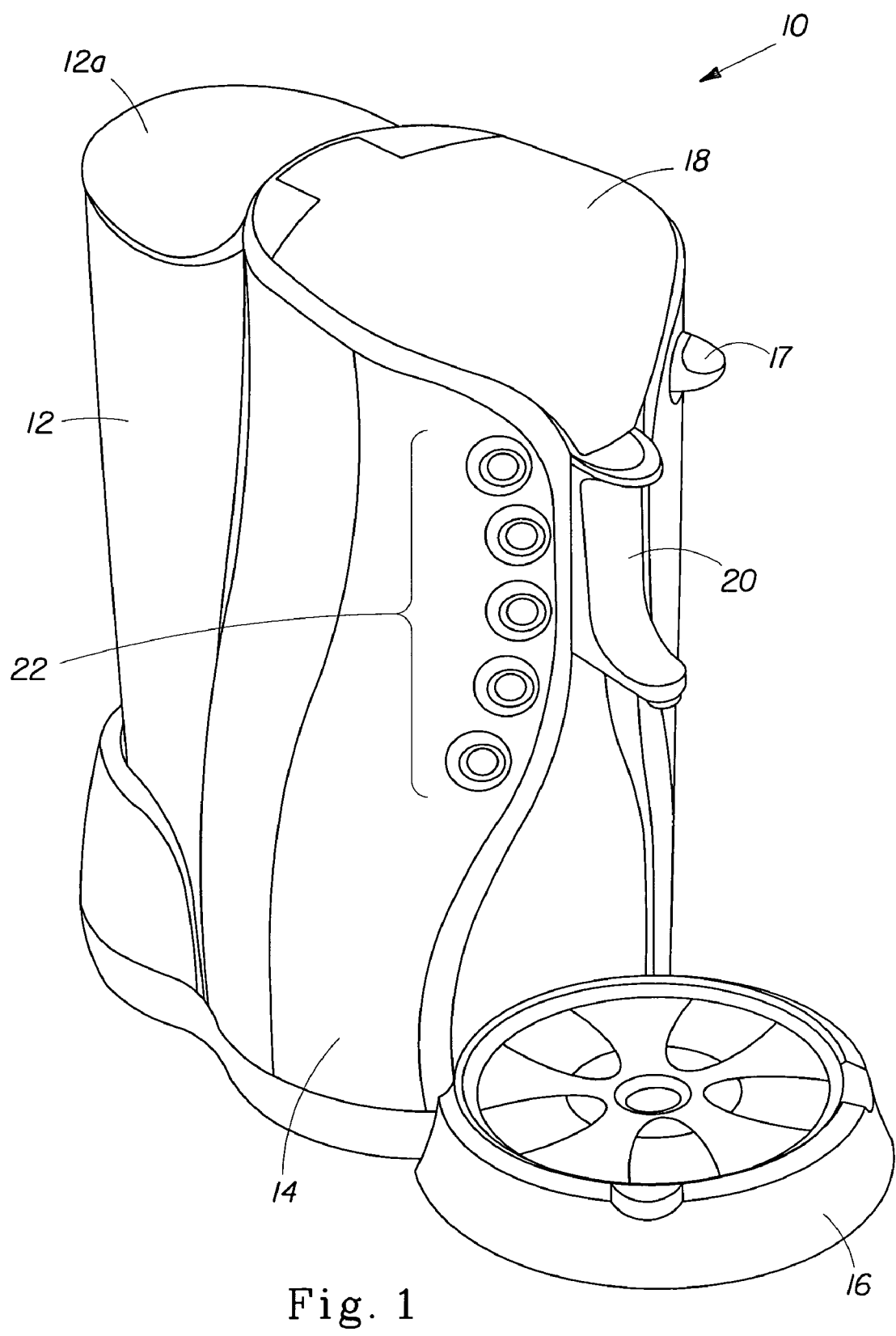
FIG. 1 is a top perspective view of one embodiment of a brewing device including a closure mechanism, a reservoir, a brewing unit and a drip tray.

Referring now to the drawings in which like numerals designate like parts throughout the various views, preferred embodiments of a brewing device are shown.

FIG. 1 shows one embodiment 10 of a brewing device. The brewing device 10 includes a reservoir 12 for holding a supply of brewing liquid such as water, a brewing unit 14 in which the brewed beverage is prepared, and a drip tray 16. The reservoir 12 is shown as a separate component from the brewing unit 14, but may of course be alternatively disposed within the brewing unit 14. The brewing unit 14 may include a release handle 17 for releasing a closure mechanism 18 (as described further below), a spout 20 for dispensing a brewed beverage, and one or more operational control switches or buttons 22 to control aspects of the brewing operation. Such aspects may include for example duration of brewing and amount of brewed beverage to dispense. The reservoir 12 may have a removable lid 12a to facilitate refilling the reservoir 12 with a brewing liquid. In FIG. 1, the closure mechanism 18 is shown in a closed position.

In operation, the brewing device 10 uses a supply of brewing liquid from the reservoir 12 in a brewing operation within the brewing unit 14 to produce a brewed beverage such as coffee. The brewing device 10 then dispenses the brewed beverage out of the spout 20 and into a cup or other receptacle disposed on or over the drip tray 16. To accomplish this, various fluid conduits are present in the brewing device 10 to form a brewing liquid supply line, as will be understood by one of ordinary skill in the art. The drip tray 16 catches and holds brewed beverage which may be accidentally dispensed through the spout 20 without a cup or receptacle disposed underneath it, or which may spill from the cup or receptacle.

Figures 2, 2A:
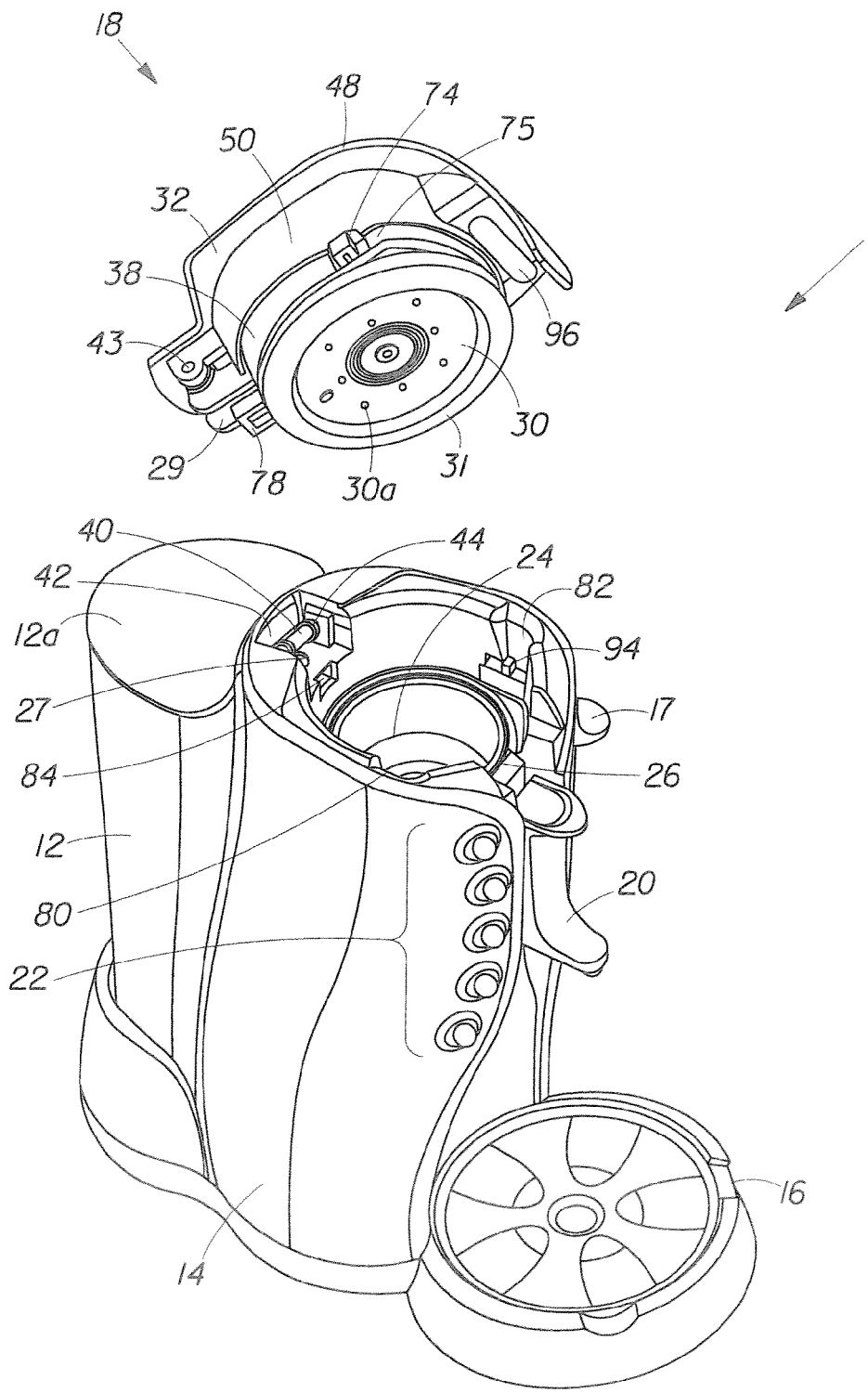
FIG. 2 is a top perspective view of the embodiment of FIG. 1, with the closure mechanism being separated from the brewing unit.

Fig. 2 shows the brewing device 10 with the closure mechanism 18 separated from the brewing unit 14, for ease of illustration. As discussed further below, in actual use, the lid indicated generally at 32 and cover 38 of the closure mechanism 18 are rotatably mounted to a pin 40 in the brewing unit 14. With the closure mechanism 18 in an upright and open position, a person using the brewing device 10 has access to a brewing chamber 24 within the brewing unit 14. This allows the user to insert a supply of brewing material into the brewing chamber 24 to perform a brewing operation, and then remove the brewing material from the brewing chamber 24 after the brewing operation has been completed. The brewing chamber 24 may comprise a brew basket 26, which may be removed from the brewing unit 14 to facilitate these operations, and also allow easy maintenance. Typically the brewing material is disposed in brew basket 26 of brewing chamber 24 on top of one or more pieces of filter material, or entirely disposed within a surrounding filter material pod which is inserted as a unit into the brew basket 26. A pod holder can be disposed on top of brew basket 26 for holding a pod of brewing material. Due to placement of pod holder in the brew basket, the brew basket is not viewable in FIG. 2. For ease of removal, pod holder may optionally comprise a handle. Whatever its form, the filter material operates to contain the brewing material within the brewing chamber 24 throughout the brewing process, while permitting brewed liquid to pass through the filter material and out the spout 20. Thus the brewing material is prevented from entering the user's cup or clogging up the system downstream of the brewing chamber 24.

A brewing operation within the brewing device may proceed as follows. With the closure mechanism 18 in an upright and open position, the user inserts an appropriate amount of brewing material into the brewing chamber 24 on top of or held within a pod of filter material, and then closes the closure mechanism 18. An electronic control module (not shown) in the brewing unit 14 operates a pump (not shown) in the brewing unit 14 to remove a supply of brewing liquid from the reservoir 12. The brewing liquid is heated by a heater (not shown) within the brewing unit 14. The pump then moves the heated brewing liquid under pressure through a flexible tube 28 (not shown) which extends from the interior of the brewing unit 14 via an exit port 27 and into the closure mechanism 18 via an entry port 29. A distributor plate 30 is attached to the underside of the closure mechanism 18, above the brewing chamber 24, to disperse the brewing liquid into the brewing chamber 24. The distributor plate 30 may be attached to the closure mechanism 18 by, for example, a threaded screw connection, a bayonet connection, an interference fit, or any other suitable connection.

The hot, pressurized water passes through one or more the openings 30a in the distributor plate 30 and down into the brewing chamber 24, where it reacts with the brewing material to form a brewed beverage. As previously described, brewing chamber 24 may advantageously include a removable pod holder for holder a pod of brewing material in an upper portion of the brewing chamber 24. Such a pod holder is shown for example in FIG. 2. A seal 31 disposed around the periphery of the distributor plate 30 ensures the hot water does not escape the system from in-between the distributor plate 30 (which is part of the rotating closure mechanism 18) and the upper rim 33 of the brewing chamber 24 in the brewing unit 14. In the embodiment of FIG. 2, the upper rim 33 is formed by the pod holder. The seal 31 may advantageously be made of silicone rubber, for example. The brewed beverage passes through the filter material and out of the brewing chamber 24 through one or more openings disposed in or near the bottom of the brew basket 26. Fluid passageways in the brewing unit 14 lead the brewed beverage to the spout 20, from which the brewed beverage may fall into a cup or other receptacle. Once the brewing operation is completed, the user may open the closure mechanism 18 again to gain access to the brewing chamber 24 and remove the used brewing material and filter material for disposal. The brewing device 10 is then ready for another brewing operation. For added safety, closure mechanism 18 may designed such that while under pressure during operation, closure mechanism 18 may not be opened.

Figure 4:
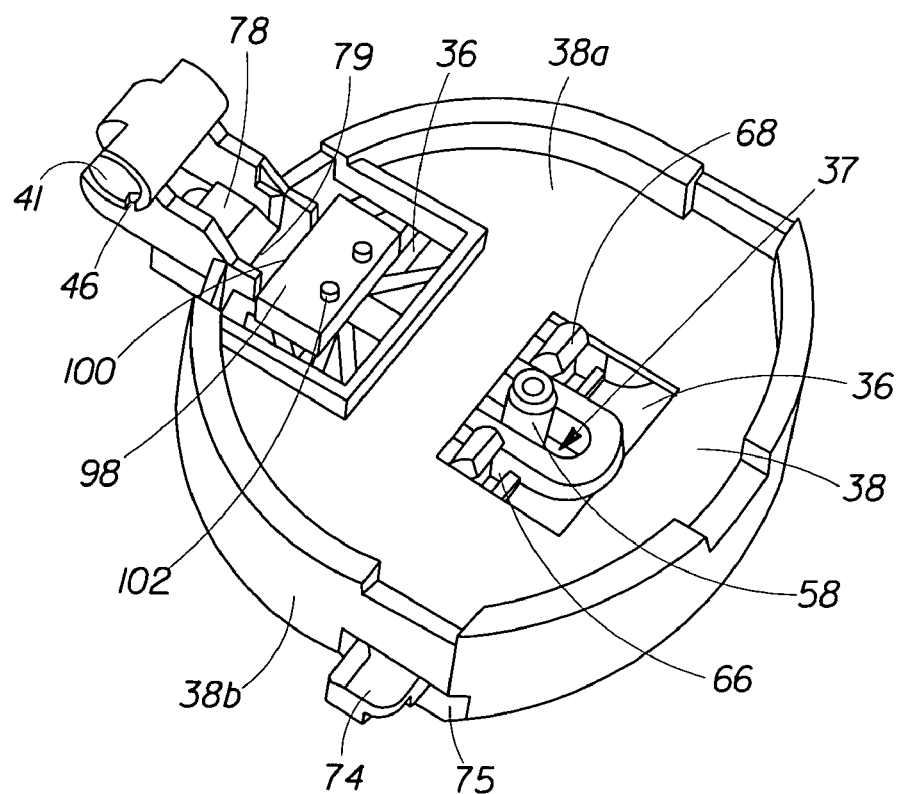
FIG. 4 is a top perspective view of one embodiment of a cover having a slider disposed inside of the cover, forming part of the closure mechanism of FIG. 2.
Figure 5:
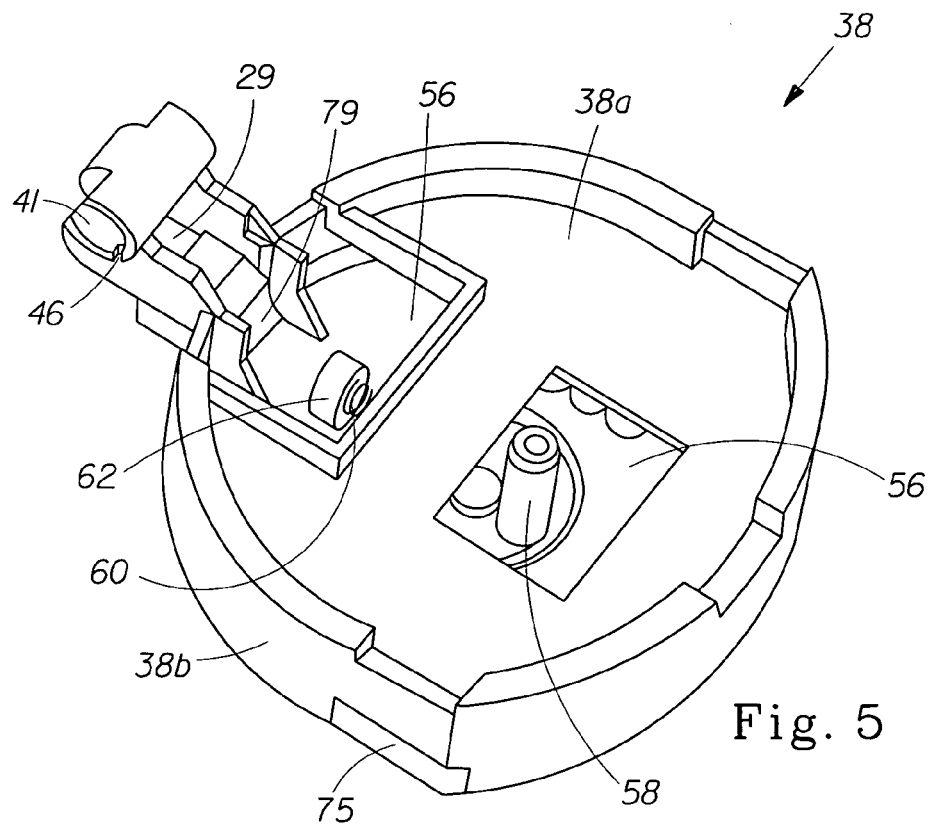
FIG. 5 is a top perspective view of one embodiment of a cover forming part of the closure mechanism of FIG. 2, with the slider shown in FIG. 4 being removed.
Figure 6:
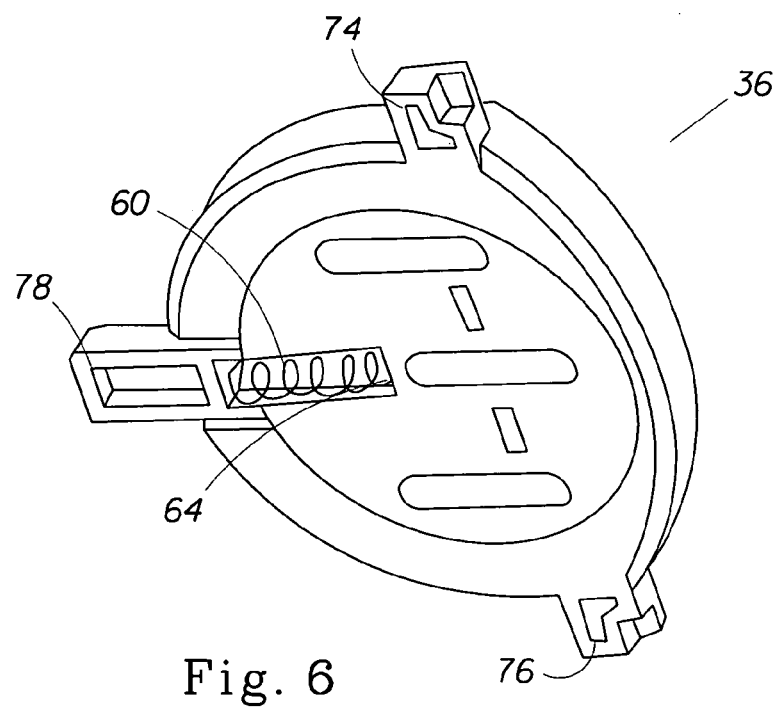
FIG. 6 is a bottom perspective view of one embodiment of a slider forming part of the closure mechanism of FIG. 2.
Figure 7:
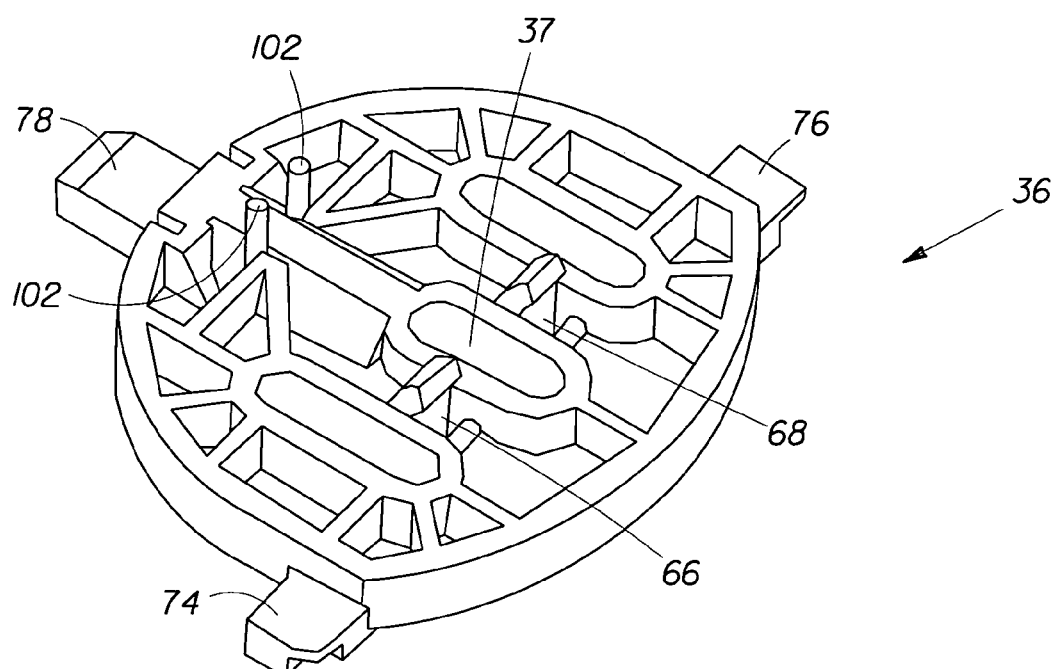
FIG. 7 is a top perspective view of the slider of FIG. 6.

The several components of the closure mechanism 18 are shown in FIGS. 3-7. The closure mechanism 18 includes a lid 32 having a link 34 rotatably attached to the underside of the lid 32. The closure mechanism 18 further includes a slider 36 (FIG. 4) disposed within the central cavity 56 of a cover 38. (The slider 36 alone is shown in FIGS. 6-7.) The lid 32 and cover 38 of the closure mechanism 18 are each rotatably mounted to the brewing unit 14, as through one or more apertures 41, 43 receiving a pin 40 held in a pin receptacle 42 within the rear portion of the brewing unit 14. As shown in FIG. 2, the or more torsion springs 44 are wrapped around the pin 40 and housed within a spring receptacle 46 (FIG. 4) of the cover 38. The spring(s) 44 urge the cover 38, and thereby the lid 32, to rotate around the pin 40 into an upright and open position.

Figure 3:
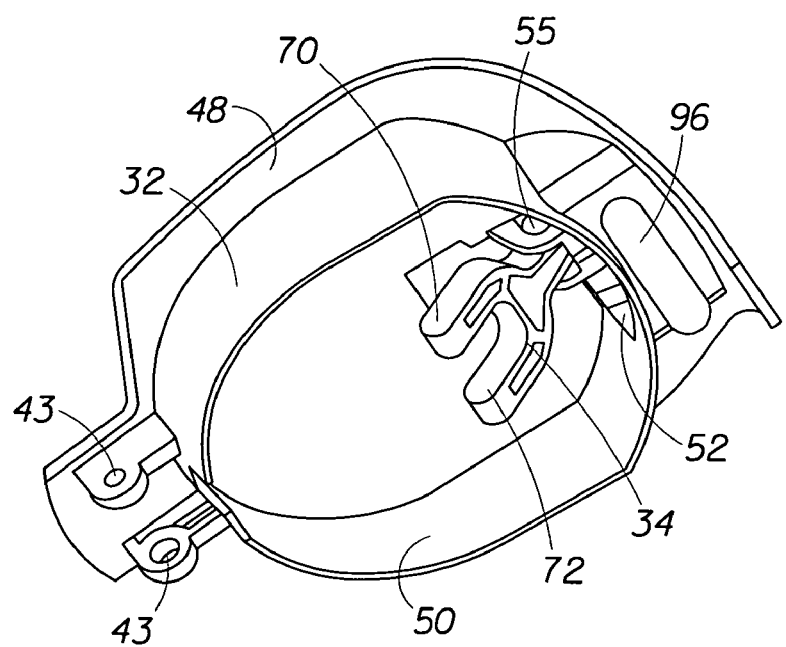
FIG. 3 is a bottom perspective view of one embodiment of a lid and a link, forming part of the closure mechanism of FIG. 2.

As illustrated in FIG. 3, the lid 32 may include a generally flat top portion 48 and a skirt portion 50 depending downwardly from it. The cover 38 may be disposed within that skirt portion 50, as shown in FIG. 2. The link 34 is rotatably held within a mount 55 on the underside of the lid 32.

The cover 38, shown by itself in FIG. 5, is advantageously composed of an upper cover module 38a and a lower cover module 38b which are joined together to form a complete cover 38. This permits easy assembly with the slider 36 disposed in-between the two modules 38a, 38b. As already discussed, a tube extends from the brewing unit 14 to the interior of the closure mechanism 18 to transport hot water under pressure to the brewing chamber 24. That tube extends in-between the lid 32 and the cover 38 to connect to a hollow extension 58 in the cover 38, which carries the hot water through the central cavity 56 in the cover 38. The slider 36 includes an elongated slot 37 through which the extension 58 passes (FIGS. 4 and 7). Hot water exiting the other side of the hollow extension 58 impinges on the top of the distributor plate 30, to be distributed through openings 30a into the brewing chamber 24.

A slider spring 60 is illustrated in FIGS. 5 and 6. The slider spring 60 may be a coil spring as shown, or alternatively a leaf spring or any other kinds of spring. The slider spring 60 is disposed within the central cavity 56 in-between a seat 62 extending up from the bottom surface of the cover 38 (as shown in FIG. 5) and a corresponding seat 64 on the slider 36 (as shown in FIG. 6). The slider spring 60 urges the slider 36 forward within the central cavity 56, for reasons discussed further below.

Figure 8:
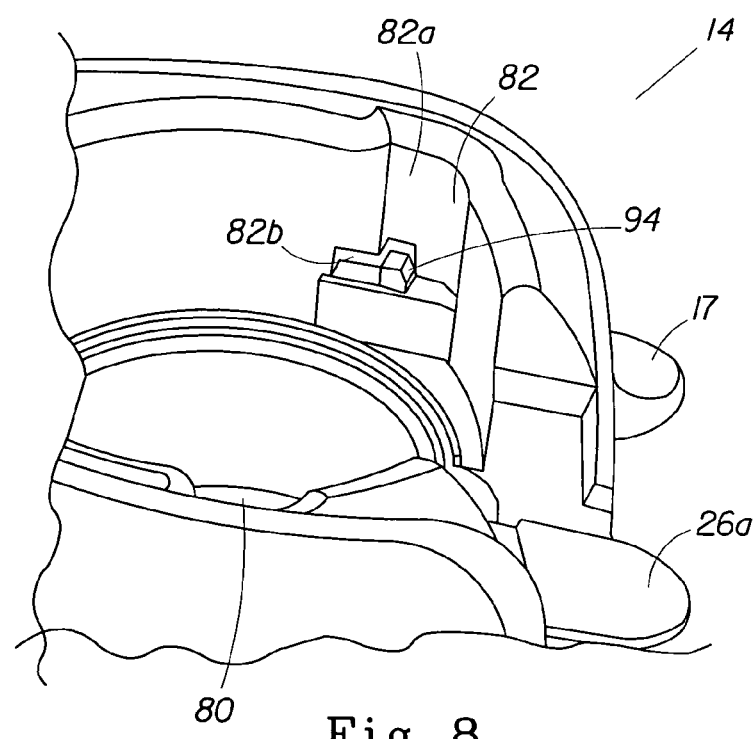
FIG. 8 is a close-up top perspective view of a brewing unit shown in FIG. 2, focusing on an L-shaped receptacle in the brewing unit.

FIGS. 6-7 illustrate a slider 36 which may be disposed within the central cavity 56 of the cover 38. The slider 36 may have two or more link seats 66, 68, each of which receives an arm 70, 72 of the link 34, as seen for example from FIGS. 3-4. The slider 36 additionally may have one or more tabs 74, 76 and 78 projecting outwardly from its sides. In the preferred embodiment shown in the Figures, the forward side tabs 74, 76 project through opposed side apertures 75, 77 in the cover 38 (except the aperture 77 is not seen in the Figures). Thus the tabs 74, 76 may be removably received respectively in forward L-shaped receptacles 80, 82 disposed in the brewing unit 14. FIG. 8 is a close-up view of the L-shaped receptacle 82, showing a vertical portion 82a and a horizontal portion 82b forming the L-shape. The receptacle 80 is similarly shaped on the opposite side of the brewing unit 14. The rear tab 78 of slider 36 may also extend through an aperture 79 (FIG. 5) in the cover 38 to be removably received in a rear receptacle 84 (FIG. 2) of the brewing unit 14. As discussed more fully below, the tabs 74, 76 and 78 operate to hold the closure mechanism 18 in its closed and sealed position.

Figure 9:
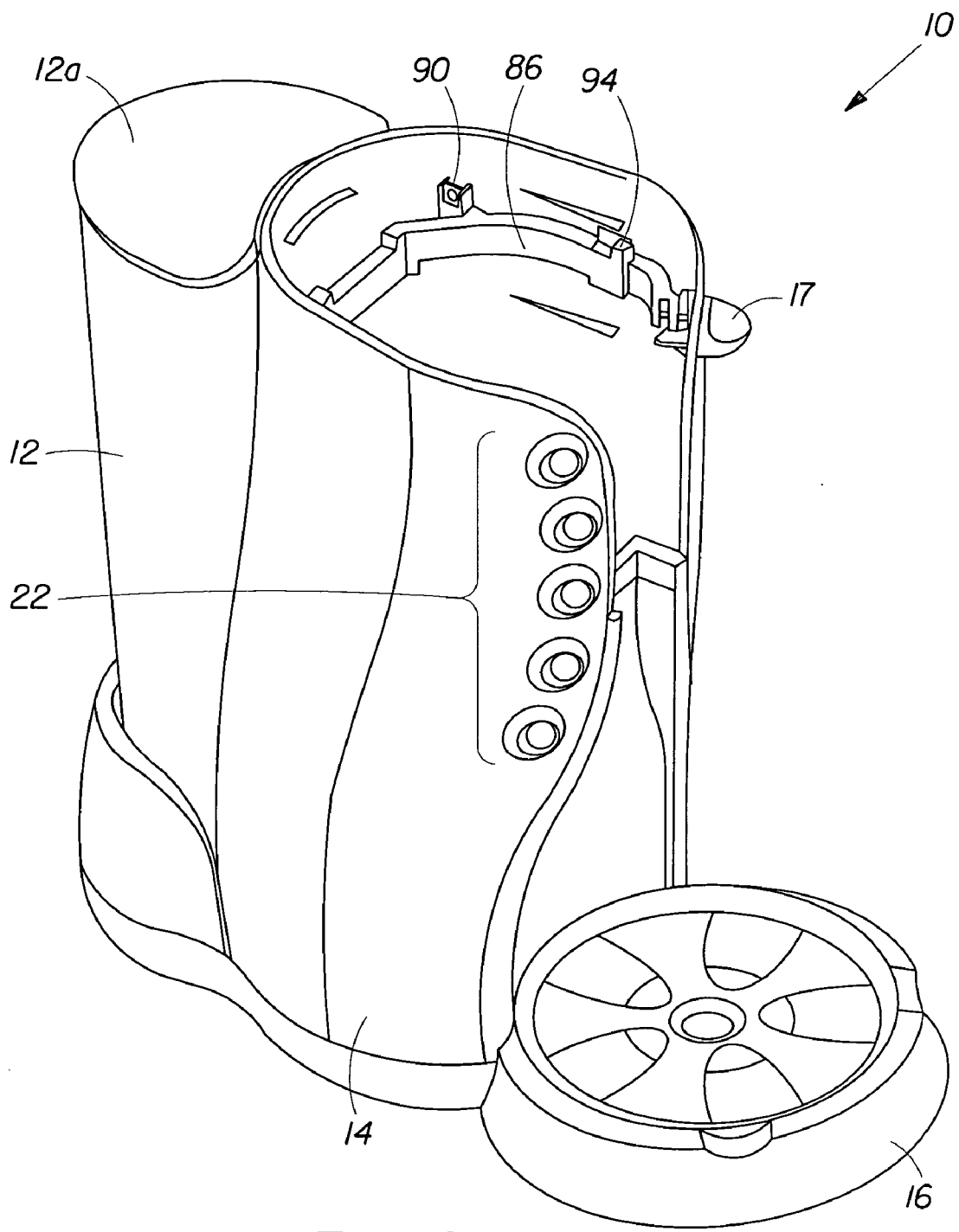
FIG. 9 is a top perspective view of one embodiment of a reservoir, brewing unit and drip tray for a brewing device shown in FIG. 2, but with several internal components of the brewing unit not shown so that the position of a release arm in the brewing unit may be seen.
Figure 10:
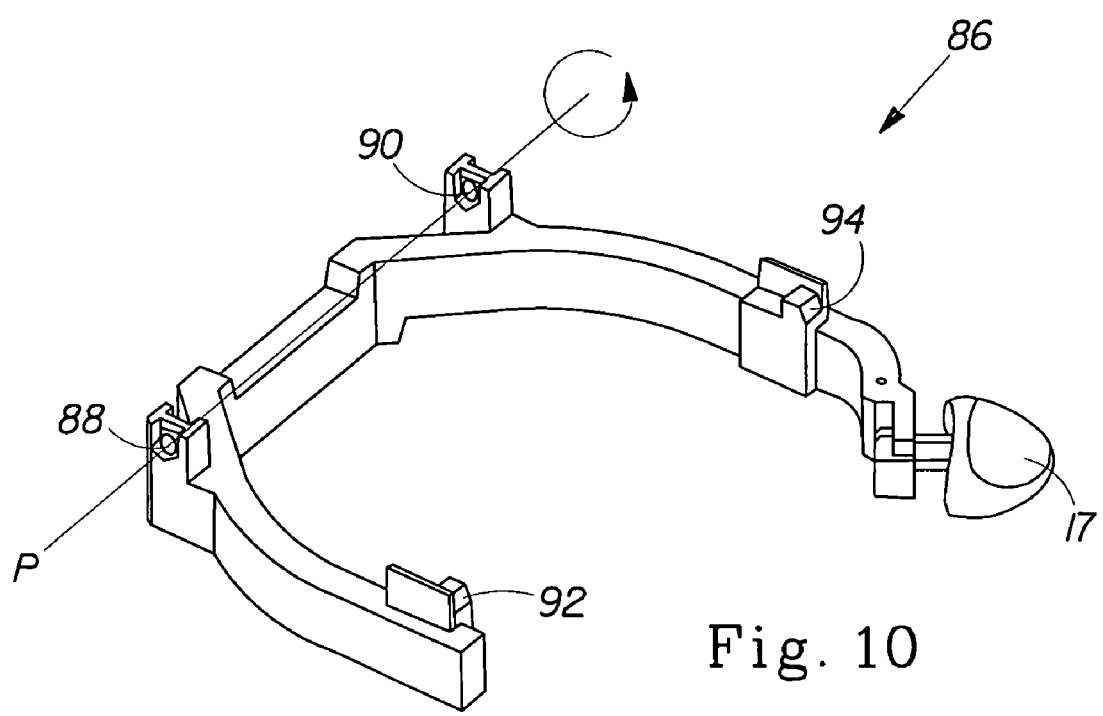
FIG. 10 is a top perspective view of one embodiment of the release arm of FIG. 9.

As shown for example in FIGS. 9-10, a release arm 86 may extend around the inner periphery of the brewing unit 14. The release arm 86 is pivotally held within the brewing unit 14 at two rotation points 88, 90 which define a pivot axis P. The release arm 86 is operatively connected at one end to the release handle 17, such as the rigid attachment shown in FIG. 10. The release handle 17 extends through and is positioned exteriorly of the brewing unit 14. One or more release arm springs (not shown) operate to urge the release arm 86 to rotate about the axis P in a direction shown by the arrow in FIG. 10, such that the release handle 17 is biased to an upper position outside of the brewing unit 14. While the description herein may focus on the use of release arm springs, it will be understood that such references are for illustration purposes only and the description should not be limited to such springs. Two blockers 92, 94 are incorporated on the release arm 86. As shown for example in FIGS. 2 and 8, the blockers 92, 94 may respectively extend up and into the forward L-shaped receptacles 80, 82 through openings in the bottom of those receptacles. As discussed more fully below, the blockers 92, 94 cooperate with the forward tabs 74, 76 of the slider 36 to hold the closure mechanism 18 in its closed and sealed position.

The closure mechanism 18 is operated in the following manner. A user first places a supply of brewing material and filter material in the brewing chamber 24. In the event a filter material pod containing the brewing material is used, various pod holders of different sizes may be provided for holding correspondingly sized pods within the brewing chamber 24. The user pushes downwardly on the front of lid 32 to rotate it towards a downward and closed position, against the bias of the torsion spring(s) 44, and the lid 32 in turn pushes the cover 38 down along with it. As the closure mechanism 18 rotates downwardly, the forward tabs 74, 76 of the slider 36 move vertically down into the vertical portions 80a, 82a of the forward L-shaped receptacles 80, 82. The cover 38 stops rotating approximately when the seal 31 contacts the upper rim 33 of the pod holder 25, thus covering the brewing chamber 24. In that position, the forward tabs 74, 76 have displaced the blockers 92, 94 down and substantially out of the receptacles 80, 82 against the bias of the release arm spring. The tabs 74, 76 thus are positioned on or near the lower boundary of the L-shaped receptacles 80, 82.

The user continues to depress the lid 32, but the cover 38 is prevented from further downward rotation by the interference between the tabs 74, 76 of the slider 36 and the boundaries of the receptacles 80, 82. Thus the pressure applied by the user rotates the lid 32, but not the cover 38. As the lid 32 rotates downwardly, the link 34—which before was just hanging free in-between lid 32 and cover 38—engages the slider 36. More particularly, the arms 70, 72 of the link 34 become received in the link seats 66, 68.

Therefore, as the lid 32 continues its downward progression, the link 34 pushes the slider 36 backwards in the central cavity 56 of the cover 38, against the bias of the slider spring 60. This causes the forward tabs 74, 76 of the slider 36 to move back into the horizontal portions 80b, 82b of the L-shaped receptacles 80, 82, and the rear tab 78 of the slider 36 to move back into the rear receptacle 84. The respective interference between the tabs 74, 76, 78 and the portions of the brewing unit 14 which define the upper extents of the receptacles 80, 82 and 84 hold the cover 38 down in the closed position against the bias of the spring(s) 44.

When the slider 36 reaches its most rearward position within the cover 38, the release arm 86 is pivotally biased upwardly allowing the blockers 92, 94 of the release arm 86 to spring up forwardly of the forward tabs 74, 76 in the L-shaped receptacles 80, 82. The blockers 92, 94 thus block the forward tabs 74, 76 within the horizontal portions 80b, 82b of the receptacles 80, 82, keeping the slider 36 trapped in a backward position against the forward bias of the slider spring 60 disposed between the slider 36 and cover 38. The release arm spring keeps the blockers 92, 94 in that upright, blocking position. Meanwhile, the user releases the lid 32. The dimensions of the lid 32, link 34 and slider 36 are such that the slider spring 60 then pushes the slider 36 forward a short distance, on the order of 2-4 mm, at which point the tabs 74, 76 contact the blockers 92, 94.

The lid 32 may be held in a downward position by a magnetic pull between a metal bar 96 disposed at the forward end of the lid 32 and magnet(s) disposed in brewing unit 14 in the proximity of the bar 96 when the lid 32 is closed. The bar 96 may be spring-loaded in the lid 32 to permit some tolerance in the closing. Of course, the magnet(s) may alternatively be arranged on the lid 32, with the metal component disposed in the brewing unit 14.

Figure 11:
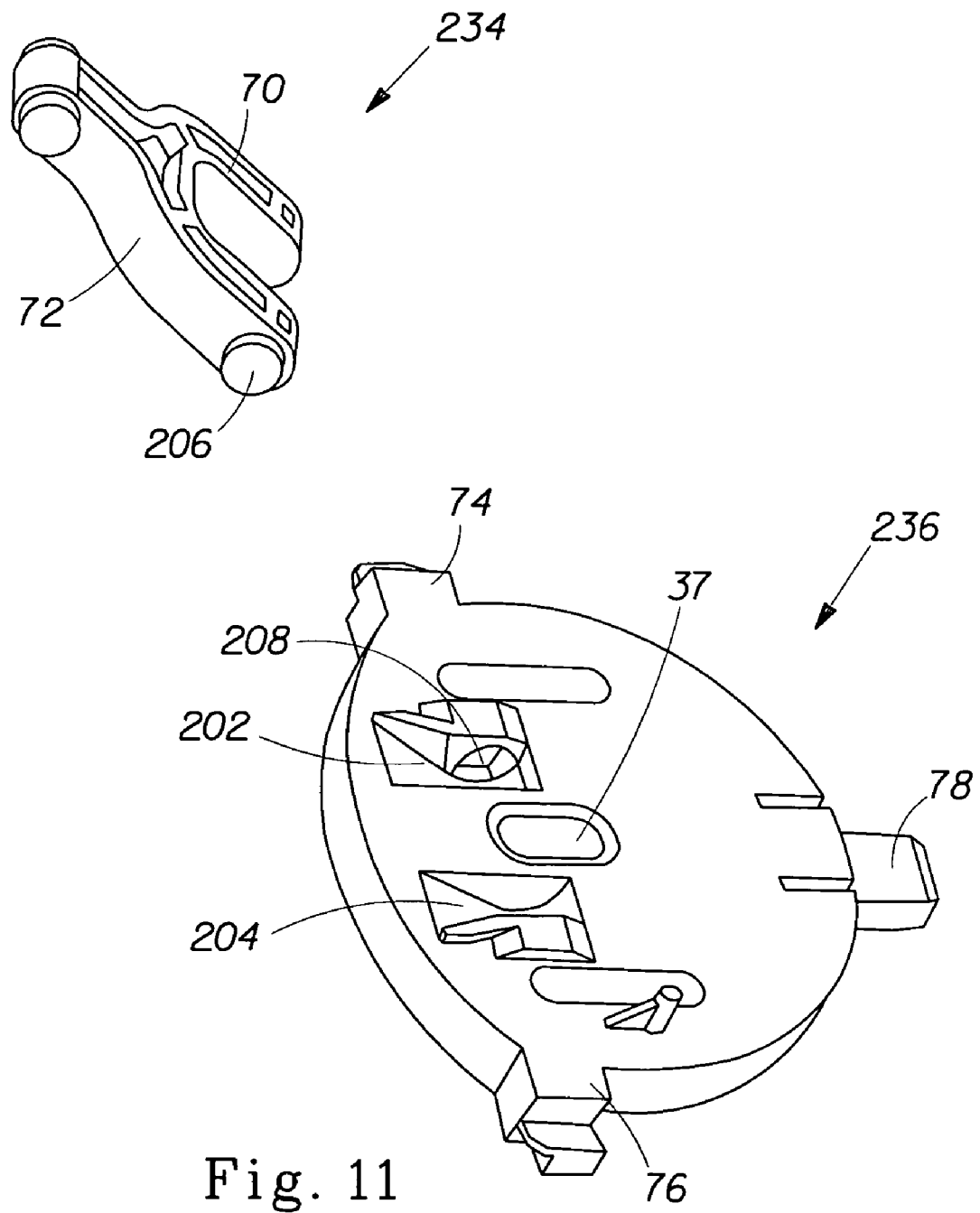
FIG. 11 is a perspective view of an alternative embodiment to the link and slider shown in FIGS. 3-4.
Figure 12:
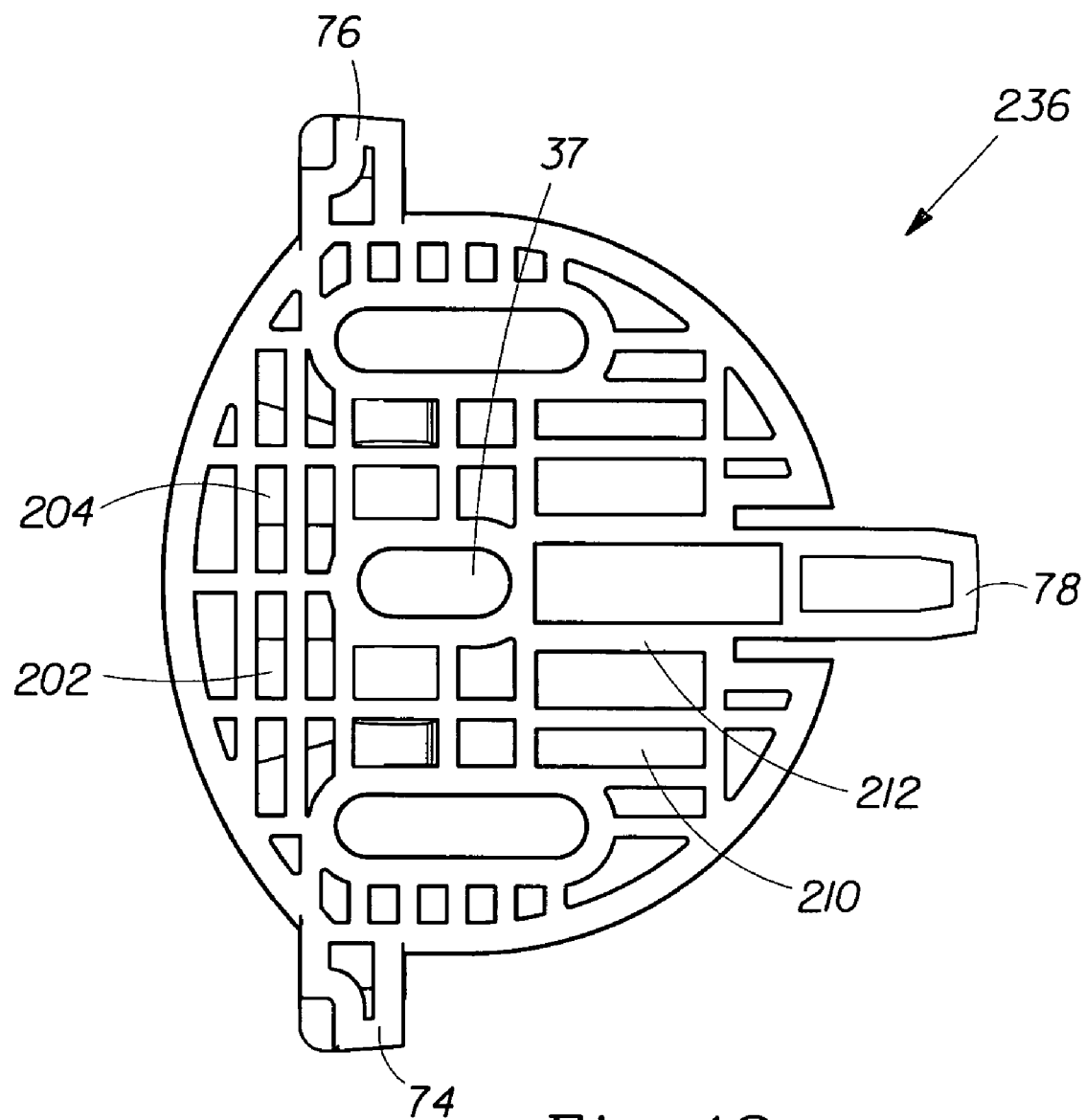
FIG. 12 is a bottom view of the alternative slider shown in FIG. 11.

Yet another type of such an interference fit is shown in FIGS. 11 and 12, illustrating an alternative embodiment to the link 34 and slider 36 of FIGS. 3-4. FIG. 11 shows a link, as indicated generally at 234, having arms 70, 72 which fit down into slots 202, 204 in a slider 236. As in the embodiment of FIGS. 3-4, the link 234 is rotatably mounted to the underside of a lid 32 on top of a cover 38 which receives the slider 236. Unlike that embodiment, however, the arms 70, 72 of the link 234 each have protruding tabs, only one 206 of which is viewable in FIG. 11. The tabs snap into receiving apertures in the sides of the slots 202, 204, only one 208 of which is viewable in FIG. 11. This provides an interference connection between the lid 32 and the cover 38. FIG. 12 shows the bottom side 210 of the slider 236. As shown there, several ribs 212 are disposed in the bottom 20 to provide structural integrity. The embodiment of FIGS. 3 and 4 similarly has ribs, but the ribs there are disposed in the top side of the slider 36 rather than the bottom.

After the closure mechanism 18 is in its closed position, the user starts a brewing operation by, for example, depressing one or more control switches 22. Once the brewing operation is completed, the user needs to remove the spent brewing material and filter material from the brewing chamber 24. So the user depresses the release handle 17, thus rotating the release arm 86 around the axis P down against the upward bias of the release arm spring. This moves the blockers 92, 94 down out of their blocking positions in the receptacles 80, 82. Therefore the slider 36 is free to move forward within the central cavity 56 of the cover 38, as urged by the slider spring 60. As it does so, its forward tabs 74, 76 move forwardly within the horizontal portions 80b, 82b of the receptacles 80, 82, and its rear tab 78 moves out of the rear receptacle 84. Also, the slider 36 pushes the link 34 forward via the seats 66, 68. That causes the lid 32 to rotate upwardly and overcome the magnetic pull between the metal bar 96 and the magnet which was keeping the lid 32 in the downward, closed position. Once the tabs 74, 76, 78 clear the restrictions of receptacles 80, 82, 84, the slider 36 and the cover 38 in which it is disposed are freed to move upward as urged by the torsion spring(s) 44. The closure mechanism 18 thus rotates to its upward, open position so the user may remove the used brewing material and filter material from the brewing chamber 24. The brewing device 10 is then ready for another brewing operation.

One of ordinary skill will know of several ways to ensure a brewing operation is not started without the closure mechanism 18 in a closed, operative position. One example is use of a limit switch 98, such as shown for example in FIG. 4. The limit switch 98 is conventional, having for example a spring lever arm 100 which in an extended position breaks an electrical circuit and in a depressed condition connects the electrical circuit. As discussed above, when the closure mechanism 18 is in its fully closed position, the slider 36 occupies a rearward position within the central cavity 56 of the cover 38. Thus, if one places a limit switch 98 on top of two posts 102 on the slider 36 proximate to the interior edge of the cover 38, as shown for example in FIG. 4, the spring lever arm 100 will be depressed by the cover 38 as the slider 36 moves backwards, thus connecting the electrical circuit. This permits the pump, heater, and other operative components to begin a brewing operation. As soon as the slider 36 moves forward again, the spring lever arm 100 extends itself, thus breaking the electrical circuit and preventing the start of a brewing operation. Of course, the limit switch 98 may alternatively be attached to the cover 38 to be triggered by a triggering surface on the slider 36 when the slider 36 moves to the rear of the cover 38.

While the present invention has been illustrated by the description of embodiments thereof, and while the embodiments have been described in considerable detail, it is not intended for this to restrict or in any way limit the scope of the claimed invention to such detail. Additional advantages and modifications will readily appear to those skilled in the art. For example, the link 34 design could be reversed from the orientation shown in the Figures, so that the link 34 is rotatably mounted to the cover 38 and is received in one or more seats disposed on the underside of the lid 32. Therefore, the invention in its broader aspects is not limited to the specific details and illustrative examples shown and described. Accordingly, departures may be made from such details without departing from the spirit or scope of the general inventive concept. In particular, the device providing a closure mechanism described herein transcends application to brewing devices, and could be successfully adapted to any of a wide variety of devices wherein a releasable sealed enclosure is desirable.

We claim:
1. A brewing device comprising:
   a brewing unit comprising a brewing chamber to receive a supply of brewing material and perform a brewing operation, and a spout for distributing a brewed liquid formed by the brewing operation;
   a closure assembly rotatably disposed above the brewing chamber between an open position and a closed position, the closure assembly comprising
      a cover member having an interior cavity, and
      a slider member slidably disposed within the interior cavity of the cover member and having a first tab which may extend outside of the interior cavity, wherein the brewing unit has a first receptacle for receiving the first tab of the slider member when the cover member is in the closed position; and
   a release arm disposed within the brewing unit, the release arm having a first blocker which releasably holds the first tab of the slider member within the first receptacle when the cover member is in the closed position;
   a slider spring operatively disposed between the cover member and the slider member to urge the slider member to slide within the interior cavity to a first position, wherein the first blocker releasably holds the slider member in a second position against the urging of the slider spring;
   a lid member rotatably disposed above the cover member and one end of a link pivotally attached to the lid member, wherein the slider member further comprises a seat for pivotally receiving a second end of the link member such that downward rotation of the lid member with respect to the cover member moves the slider member from the first position to the second position through the link member.

2. A brewing device as in claim 1, wherein the slider member has a second tab which may extend outside of the interior cavity of the cover member, and the brewing unit has a second receptacle for receiving the second tab of the slider member when the cover member is in the closed position.

3. A brewing device as in claim 2, wherein the release arm has a second blocker which releasably holds the second tab of the slider member within the second receptacle when the cover member is in the closed position.

4. A brewing device as in claim 3, wherein the slider member has a third tab which may extend outside of the interior cavity of the cover member, and the brewing unit has a third receptacle for receiving the third tab of the slider member when the cover member is in the closed position.

5. A brewing device as in claim 1, further comprising a limit switch which operates to prevent the brewing device from performing a brewing operation unless the cover member is in a closed position.

6. A brewing device as in claim 1, further comprising a lid member rotatably disposed above the cover member and a link attached to the slider member, wherein the lid member comprises a seat for pivotally receiving the link member such that downward rotation of the lid member with respect to the cover member moves the slider member from the first position to the second position through the link member.

7. A brewing device as in claim 1, further comprising a brewing reservoir which stores a supply of brewing liquid and one or more fluid conduits forming a brewing liquid supply line which extends from the brewing reservoir to the brewing chamber, wherein part of the supply line is formed by a flexible tube which extends out of the brewing unit and into the closure assembly.

8. A brewing device as in claim 7, further comprising a seal disposed between the closure assembly and the brewing unit.

9. A brewing device as in claim 8 wherein the supply line ends at a distributor plate disposed underneath the cover member and above the brewing chamber.

10. A closure mechanism for a device comprising:
a cover member rotatably disposed above the device between an open position and a closed position and having an interior cavity;
a slider member slidably disposed within the interior cavity of the cover member and having a first tab which may extend outside of the interior cavity, wherein the device has a first receptacle for receiving the first tab of the slider member when the cover member is in the closed position;
wherein a release arm is disposed within the device, the release arm having a first blocker which releasably holds the first tab of the slider member within the first receptacle when the cover member is in the closed position;
wherein the release arm is connected to a release handle disposed outside of the device to allow operation of the release arm by a user through use of the release handle, with downward movement of the release arm moving the first blocker to release the first tab of the slider member;
wherein the slider member has a second tab which may extend outside of the interior cavity of the cover member, and the device has a second receptacle for receiving the second tab of the slider member when the cover member is in the closed position;
wherein the release arm has a second blocker which releasably holds the second tab of the slider member within the second receptacle when the cover member is in the closed position;
wherein the slider member has a third tab which may extend outside of the interior cavity of the cover member, and the device has a third receptacle for receiving the third tab of the slider member when the cover member is in the closed position.

11. A closure mechanism for a device comprising:
a cover member rotatably disposed above the device between an open position and a closed position and having an interior cavity;
a slider member slidably disposed within the interior cavity of the cover member and having a first tab which may extend outside of the interior cavity, wherein the device has a first receptacle for receiving the first tab of the slider member when the cover member is in the closed position;
wherein a release arm is disposed within the device, the release arm having a first blocker which releasably holds the first tab of the slider member within the first receptacle when the cover member is in the closed position;
a slider spring operatively disposed between the cover member and the slider member to urge the slider member to slide within the interior cavity to a first position, wherein the first blocker releasably holds the slider member in a second position against the urging of the slider spring;
a lid member rotatably disposed above the cover member and a link attached to the lid member, wherein the slider member further comprises a seat for pivotally receiving a first end of the link member such that downward rotation of the lid member with respect to the cover member moves the slider member from the first position to the second position through the link member.

12. A closure mechanism as in claim 11, further comprising a limit switch which operates to prevent the device from performing operations unless the cover member is in a closed position.

13. A closure mechanism as in claim 11, further comprising a lid member rotatably disposed above the cover member and a link attached to the slider member, wherein the lid member comprises a seat for pivotally receiving a second end of the link member such that downward rotation of the lid member with respect to the cover member moves the slider member from the first position to the second position through the link member.

* * * * *